(12) United States Patent
Hitchings

(10) Patent No.: US 8,273,289 B2
(45) Date of Patent: Sep. 25, 2012

(54) REFRACTORY COATING FOR SILICA MESH FABRIC

(76) Inventor: Jay R. Hitchings, Downingtown, PA (US)

( * ) Notice: Subject to any disclaimer, the term of this patent is extended or adjusted under 35 U.S.C. 154(b) by 1265 days.

(21) Appl. No.: 11/983,642

(22) Filed: Nov. 9, 2007

(65) Prior Publication Data

US 2008/0173591 A1    Jul. 24, 2008

Related U.S. Application Data

(60) Provisional application No. 60/858,104, filed on Nov. 9, 2006.

(51) Int. Cl.
*B01D 39/08* (2006.01)

(52) U.S. Cl. .......................... 266/230; 266/44
(58) Field of Classification Search .................. 266/44, 266/227, 230
See application file for complete search history.

(56) References Cited

U.S. PATENT DOCUMENTS

| | | | |
|---|---|---|---|
| 2,757,425 A | 8/1956 | Duncan et al. | |
| 2,995,453 A * | 8/1961 | Noble et al. | ................. 501/153 |
| 3,041,205 A | 6/1962 | Iler | |
| 4,015,038 A * | 3/1977 | Romanski et al. | ................ 442/4 |
| 4,096,104 A | 6/1978 | Spain et al. | |
| 4,322,464 A | 3/1982 | Beckley | |
| 4,857,489 A | 8/1989 | Bearden | |
| 5,124,040 A * | 6/1992 | Hitchings | ................ 210/639 |
| 5,238,571 A | 8/1993 | Menk | |
| 5,676,731 A * | 10/1997 | Hitchings | ................ 266/227 |
| 6,254,810 B1 * | 7/2001 | Delvaux et al. | ............. 264/29.1 |
| 7,204,955 B2 | 4/2007 | Vincent | |
| 2002/0119717 A1 | 8/2002 | Taylor, Jr. et al. | |
| 2004/0132607 A1 | 7/2004 | Wood et al. | |
| 2006/0141413 A1 | 6/2006 | Masten et al. | |
| 2006/0266673 A1 | 11/2006 | Rende et al. | |
| 2008/0173591 A1 * | 7/2008 | Hitchings | ................ 210/767 |

OTHER PUBLICATIONS

Hitco Carbon Composites, Inc., Refrasil Cloth, Refractory Silica Cloth Products, 2 pp., Apr. 25, 2006.

* cited by examiner

*Primary Examiner* — Scott Kastler
(74) *Attorney, Agent, or Firm* — Alan G. Towner, Esq.; Pietragallo Gordon Alfano Bosick & Raspanti, LLP

(57) ABSTRACT

Coated silica mesh fabrics for use in metal casting operations are disclosed. The refractory coating comprises a mixture of colloidal silica binder and refractory particles such as zirconia flour. A slurry comprising the colloidal silica and refractory particles is applied to the silica mesh fabric and allowed to dry. The coated silica mesh fabric may be used in metal casting operations at relatively high molten metal temperatures above 3,000° F.

16 Claims, 1 Drawing Sheet

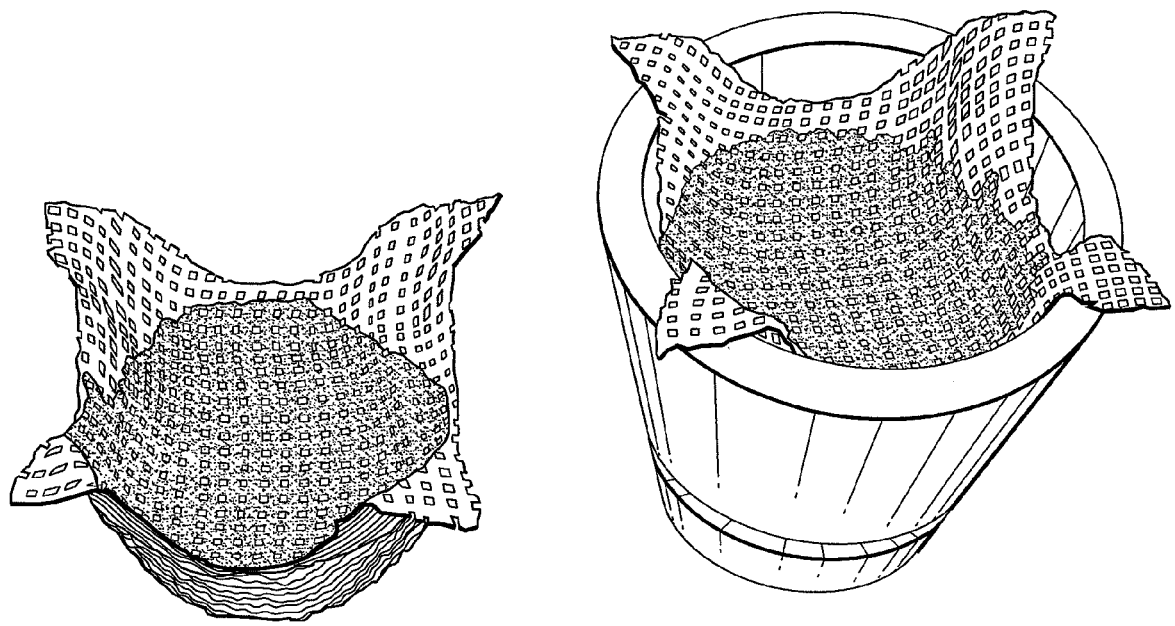

REFRACTORY COATING FOR SILICA MESH FABRIC

CROSS-REFERENCE TO RELATED APPLICATION

This application claims the benefit of U.S. Provisional Application No. 60/858,104 filed Nov. 9, 2006, which is incorporated herein by reference.

FIELD OF THE INVENTION

The present invention relates to filters for use in metal casting, and more particularly relates to silica mesh filters having a refractory coating.

BACKGROUND INFORMATION

Silica mesh filter cloth has been used in various types of metal casting operations. Although such filters perform well at certain temperatures, their thermal properties do not allow them to be used at elevated molten metal temperatures, e.g., above 3,000° F.

SUMMARY OF THE INVENTION

The present invention provides coated silica mesh fabric for use in metal casting operations. The refractory coating comprises a mixture of colloidal silica binder and refractory particles such as zirconia flour. A slurry comprising the colloidal silica and refractory particles is applied to the silica mesh fabric and allowed to dry. The coated silica mesh fabric may be used in metal casting operations at relatively high molten metal temperatures above 3,000° F.

An aspect of the present invention is to provide a molten metal filter comprising silica cloth coated with a refractory coating including refractory particles and a colloidal silica binder.

Another aspect of the present invention is to provide a method of making a molten metal filter comprising: providing a silica cloth filter material, and coating at least a portion of the silica cloth filter material with a refractory coating comprising refractory particles and a colloidal silica binder.

A further aspect of the present invention is to provide a method of filtering molten metal comprising passing the molten metal through a filter comprising silica cloth coated with a refractory coating including refractory particles and a colloidal silica binder.

These and other aspects of the present invention will be more apparent from the following description.

BRIEF DESCRIPTION OF THE DRAWINGS

The figure is an isometric view of a shaped silica mesh filter cup coated with a refractory coating and another similar filter cup placed in a molten metal pouring funnel in accordance with embodiments of the present invention.

DETAILED DESCRIPTION

FIG. 1 is a photograph showing a refractory coated filter cup and another similar filter cup placed into a pouring funnel in accordance with embodiments of the present invention. The silica refractory cloth, coated with a phenolic resin, can be thermally molded into many different shapes. Two shapes produced with a mesh fabric are filter cups that are used in the investment casting industry and, in foundry applications, small flat pieces of fabric placed at the neck of iron casting risers to facilitate their removal.

Filter cups used for investment casting operations are typically placed into pouring funnels that receive the molten metal going into a lost wax investment casting mold. The incoming metal is thus filtered and cleaned of slag and inclusions during the pour. The refractory cloth filter cups may be removed, before the metal solidifies, so that the sprue can be re-charged back into the furnace without the slag-containing filter cup.

Another application for the present coated refractory silica mesh cloth is its placement at the neck of an iron-casting or steel riser, which allows the riser to be removed from the casting by impact instead of having to be cut off. In some cases the cross sectional area of the riser neck is large, and especially in the case of a hot riser, conventional silica cloth deflects or bends in the direction of metal flow or towards the casting. When the fabric extends into the casting it must be scraped. When this occurs it necessitates the moving of the piece of cloth further away from the casting surface, which leaves a larger stub of metal to be ground off. Ideally, the piece of cloth should be placed as close to the casting surface as possible so that minimal grinding is required after the riser is knocked off. The coated silica mesh filter cloth of the present invention causes the mesh cloth to become much more rigid and stronger, thus reducing any movement or bending of the cloth and allowing it to be placed closer to the casting surface.

In accordance with an embodiment of the invention, the silica mesh refractory cloth is composed of silica ($SiO_2$) filaments that have been woven using a mock leno construction. Silica mesh fabric has thermal properties that allow it to be used in the filtration of molten metals such as cast iron and also nonferrous metals like copper and aluminum. Silica mesh filter cloth has thermal properties approaching 3,000° F. However, some stainless steels and other more exotic alloys, used in investment casting operations, have molten metal pouring temperatures very close to the maximum temperature allowable for the cloth. If the metal is poured slowly or impinged directly on one small area of the filter cup, the cloth can fail and allow unfiltered metal to enter the investment cavity. The present invention provides a method of treating existing filter cups that enhances their thermal properties and reduces the chance of failure during pouring. The treatment also makes the cup stronger and more rigid.

Almost all silica raw material used in the production of the filaments and yarn used in weaving the mesh cloth contains very minute amounts, parts per billion, of arsenic. This conventionally was the cause for rejection of the use of the filter cups at investment casting foundries that were producing extremely critical castings such as single crystal turbine blades. This invention prevents the molten metal from coming into direct contact with the cloth, thus preventing any possible chance of contamination, even though the chance of contamination of arsenic into the molten metal was very remote without the application of this invention.

An embodiment of the present invention consists of coating a phenolic resin coated silica mesh cloth with a ceramic refractory coating. The various forms that the cloth can be shaped into such as investment casting filter cups and small flat pieces used for riser knock-off applications, can be easily coated by dipping, painting, or spraying. One type of refractory coating consists of a mixture of a colloidal silica based binder and zirconia flour refractory. Other binders and refractories may be used, but they should provide thermal properties that exceed that of silica mesh cloth.

The ceramic refractories used should have a mesh size that is typically −200 to −325 mesh so that a fine smooth surface coating is produced on the cloth surface, and the coating should not be so heavy that it blocks or closes the openings in the mesh.

The refractory particles typically have average sizes from about 20 to about 80 microns, for example, from about 32 to about 47 microns. The colloidal silica binder comprises silica particles typically having average sizes from about 5 to about 30 nm, for example, from about 10 to about 15 nm.

The refractory coating typically has a weight ratio of refractory particles to colloidal silica of from about 2.5:1 to about 4.7:1, for example, from about 3.4:1 to about 3.7:1.

A colloidal silica binder has shown to provide excellent wetting properties, and short drain and drying times.

A typical example is as follows:
For a 5 gallon slurry formulation:
Refractory solids range of 30.0-30.9%
Colloidal silica binder: 21.97 lbs
Zirconia flour refractory: 76.9 lbs
Slurry density: 2.65-2.78 gm/ml The slurry is mixed with a propeller mixer with constant agitation, but not enough to cause air entrainment that would cause bubbles to form in the coating. The colloidal silica slurry is stabilized before use. Stabilization is usually achieved after approximately two hours of stirring time.

The viscosity of the slurry can be increased by adding more refractory or it can be decreased by adding more binder. Viscosity will increase as water evaporation occurs, and deionized or distilled water should be added to reduce it. The use of tap water can cause premature gelation. The pH of the binder should be maintained between 9.25 and 10.70 for best results, and the temperature should be maintained at not more than 10° F. (6° C.) above ambient temperature for conventional colloidal silica slurries. Food dyes can be added to the slurry to impart different colors to the dried coating.

Once the slurry is stabilized, the silica mesh cloth can be coated by dipping, painting or spraying the slurry onto the area of the cloth that will be contacted by molten metal. Repeated applications can be used to build up a heavier coating if desired.

The coated pieces can then be air dried or by placing them into an oven, e.g., at 185° F. until the coating is hard and dry.

Whereas particular embodiments of this invention have been described above for purposes of illustration, it will be evident to those skilled in the art that numerous variations of the details of the present invention may be made without departing from the invention as defined in the appended claims.

The invention claimed is:

1. A molten metal filter comprising silica cloth coated with a refractory coating including refractory particles and a colloidal silica binder, and phenolic resin between the silica cloth and the refractory coating.

2. The molten metal filter of claim 1, wherein the silica cloth is woven.

3. The molten metal filter of claim 2, wherein the woven silica coth comprises a mock leno weave.

4. The molten metal filter of claim 1, wherein the refractory particles have an average size of from about 32 to about 47 microns, and the colloidal silica binder comprises silica particles having an average size of from about 10 nm to about 15 nm.

5. The molten metal filter of claim 1, wherein the refractory particles comprise zirconia flour.

6. The molten metal filter of claim 1, wherein the refractory coating has a weight ratio of the refractory particles to the colloidal silica of from about 2.5:1 to about 4.7:1.

7. The molten metal filter of claim 1, wherein the refractory coating has a weight ratio of the refractory particles to the colloidal silica of from about 3.4:1 to about 3.7:1.

8. The molten metal filter of claim 1, wherein the filter is substantially flat.

9. The molten metal filter of claim 1, wherein the filter is substantially cup-shaped.

10. A method of making a molten metal filter comprising:
providing a silica cloth filter material coated with phenolic resin; and
coating at least a portion of the silica cloth filter material and phenolic resin with a refractory coating comprising refractory particles and a colloidal silica binder.

11. The method of claim 10, further comprising shaping the silica cloth filter material prior to the coating step.

12. The method of claim 11, wherein the silica cloth filter material is shaped in the form of a cup.

13. The method of claim 10, wherein the refractory coating is applied to the silica cloth filter material by dipping, spraying or painting with a slurry comprising the refractory particles and the colloidal silica binder in a liquid carrier.

14. The method of claim 13, wherein the liquid carrier comprises water.

15. The method of claim 13, wherein the slurry has a pH greater than 9.

16. The method of claim 15, wherein the pH of the slurry is from about 9.25 to about 10.7.

* * * * *